United States Patent [19]

Erich et al.

[11] 4,103,759

[45] Aug. 1, 1978

[54] LUBRICATING SYSTEM FOR AN ANTIFRICTION BEARING

[75] Inventors: Hans Erich, Kiel-Schulensee; Alfred Jordt, Neumühlen-Dietrichsdorf; Klaus König, Kiel, all of Germany

[73] Assignee: Anschutz & Co. G.m.b.H., Germany

[21] Appl. No.: 774,313

[22] Filed: Mar. 4, 1977

[30] Foreign Application Priority Data

Mar. 9, 1976 [DE] Fed. Rep. of Germany ....... 2609736

[51] Int. Cl.² ............................................. F16N 7/12
[52] U.S. Cl. ....................................... 184/64; 184/31; 308/187
[58] Field of Search ................... 308/187, 86, 98, 125; 184/64, 102, 31, 43

[56] References Cited

U.S. PATENT DOCUMENTS

| | | | |
|---|---|---|---|
| 1,433,424 | 10/1922 | Stoner | 308/98 UX |
| 1,723,010 | 8/1929 | Brump | 184/64 UX |
| 1,880,334 | 10/1932 | Steiner | 308/125 UX |
| 2,037,074 | 4/1936 | Griswold | 308/187 |
| 2,271,820 | 2/1942 | Hamilton | 308/187 |
| 2,284,446 | 5/1942 | Powers | 308/187 |
| 2,625,885 | 1/1953 | Mumma | 184/31 X |
| 2,942,919 | 6/1960 | Beerli | 308/187 |

Primary Examiner—David H. Brown
Attorney, Agent, or Firm—Shlesinger, Fitzsimmons & Shlesinger

[57] ABSTRACT

A lubricating system for an antifriction bearing comprises a supporting member fixed to the outer race ring of the bearing and provided with a plurality of passageways, a filling of porous material soaked with a liquid lubricant mounted in said passageways and in spaces located laterally of the antifriction bearing and surrounding the shaft journalled by the antifriction bearing in the supporting element, a disc fixed to the shaft in one of such spaces for hurling lubricant seeping through the bearing onto the filling to be absorbed thereby and means for mounting a wick in the other one of said spaces in frictional contact with the shaft and in contact with the porous material, said wick transferring lubricant from the porous material to a peripheral surface of the shaft wherefrom the lubricant passes through the antifriction bearing and into contact with said disc. As a result, the lubricant is circulated through the antifriction bearing without escaping therefrom. The peripheral surface of the shaft contacted by the wick is preferably provided with a helical groove feeding the lubricant towards the inner race of the antifriction bearing. Preferably one of the passageways extending through the supporting member is kept free of the porous material and serves as an air conduit conducting air impelled by the rotating disc from the space containing the disc to the space containing the wick and from there through the bearing. This circulation of air through the bearing promotes a circulation of the lubricant.

7 Claims, 4 Drawing Figures

LUBRICATING SYSTEM FOR AN ANTIFRICTION BEARING

BACKGROUND OF THE INVENTION

1. Field of the Invention

This invention relates to improvements in a lubricating system for an antifriction bearing in which any substantial quantity of freely movable liquid lubricant as might affect the location of the center of gravity of the bearing under the influence of acceleration in any direction is avoided, as is desirable for instance where such antifriction bearings are used in gyroscopic instruments mounted on movable carriers, such as ships or aircraft.

2. Description of the Prior Art

In U.S. Pat. No. 2,284,446 issued on May 26, 1942 a lubricating system for a roller bearing is disclosed in which an outer race ring of the bearing is mounted in a supporting member provided with a circumferential set of lubricant-storing cavities and with a wick extending from such cavities into contact with a surface of revolution coaxial with the inner race ring and rotating therewith. On the other side of the inner race ring a disc is mounted on the shaft journalled by the antifriction bearing in the supporting member. The periphery of the disc is located in a space wherefrom the liquid lubricant is conducted outwardly through conduits. Therefore, the lubricant is not circulated through the bearing, particularly, when the shaft is located horizontally.

OBJECTS OF THE INVENTION

It is an object of the invention to so design the lubricating system of an antifriction bearing that in operation the lubricant is circulated through the bearing without getting lost and without forming any substantial quantities of liquid that are freely movable under the effect of accelerations. It is another object of the invention to provide a lubricating system for an antifriction bearing in a gyroscopic instrument in which rotation of a shaft journalled by the antifriction bearing in a support causes circulation of a liquid lubricant through the antifriction bearing without influencing the location of the center of gravity of the elements of the lubricating system under the influence of acceleration forces acting on the craft or vessel on which the gyroscopic instrument is mounted. More particularly it is an object of the invention to provide a lubricating system of the character described in which the liquid lubricant is permanently kept in a condition in which it is absorbed by porous material mounted in fixed location with respect to the support in which a shaft is journalled by means of the antifriction bearing, except for extremely small globules of lubricant hurled freely through free space from the shaft onto the porous material.

SUMMARY OF THE INVENTION

In a preferred embodiment of our invention the following elements are combined with each other:

A rotary shaft, an inner race ring thereon, an outer race ring surrounding said inner race ring, a set of antifriction elements mounted between said race rings for rolling motion thereon, a supporting member fixed to said outer race ring and surrounding in spaced relationship such portions of said shaft as extend out of said inner race ring, a disc on one of said portions, a plurality of passageways extending through said supporting member in parallel relationship to said shaft and communicating with spaces located between said shaft and said supporting member laterally of said race rings, a filling of porous material soaked with a liquid lubricant mounted in said passageways and in said spaces and surrounding said disc for interception of lubricant globules hurled from the periphery of said disc through one of said spaces, a wick, and means for mounting said wick in the other one of said spaces in frictional contact with the other one of said portions of said shaft and in contact with said porous material located in the other one of said spaces.

In this system the lubricant is circulated through the bearing in the following manner: Lubricant absorbed by the wick is transferred in form of a thin film to a portion of the shaft extending from the inner race ring. This film creeps on the inner race ring and from there into contact with the disc. Extremely small globules of lubricant are hurled from the periphery of the disc through a very short distance upon the surrounding filling of a porous material and are soaked up by such filling. Since the wick continually withdraws liquid lubricant from the filling, the lubricant is moved by capillary action through the passageways of the supporting member within the filling towards the wick for repetition of the circulation. As practically all of the lubricant participates in such circulation, no lubricant will get lost from the lubricating system. The surface of revolution of the shaft contacted by the wick may be preferably provided with a helical groove which will promote the creeping of the lubricant from the surface of revolution to the inner race ring of the bearing.

BRIEF DESCRIPTION OF THE DRAWING

In the drawing in which preferred embodiments of our invention are illustrated.

Figure 1:
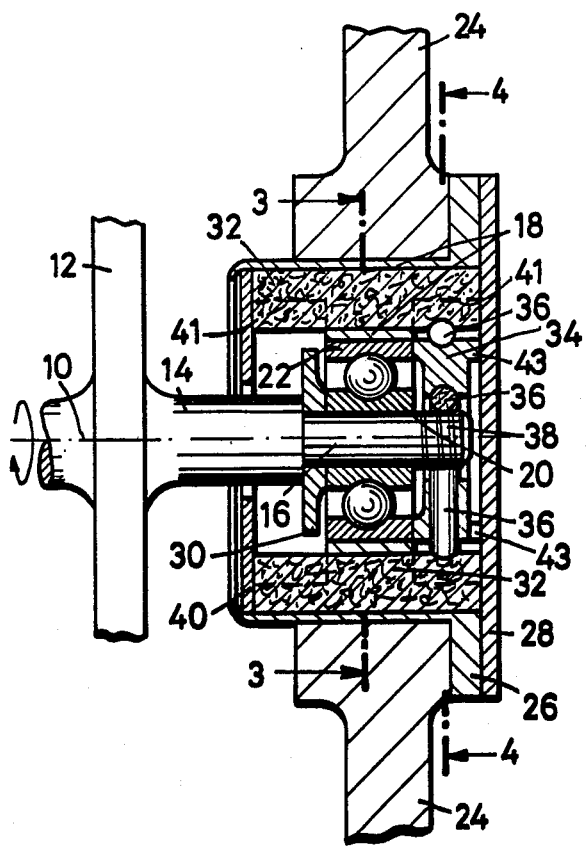
FIG. 1 is a longitudinal section through a ball-bearing and through a supporting member carrying the same, the shaft journalled by the ball-bearing being shown in elevation.

A rotor 12 rotating about the axis 10 in the direction of the arrow is carried by a shaft 14 which may be integral with the rotor 12 and has an end section 16 of reduced diameter. Shaft section 16 is journalled in a supporting member formed by a bushing 18 by means of a ball-bearing composed of an inner race ring 20, an outer race ring 22 and a set of spherical antifriction elements mounted therebetween for rolling motion thereon. The inner race ring 20 is fixedly mounted on the shaft section 16 and the outer race ring 22 is fixedly mounted in the bushing 18. This bushing is inserted in an aperture of a wall 24 forming part of a housing containing the rotor 12. Bushing 18 is provided with a flange 26 positioned on the outside of wall 24 and carrying a cover plate 28. The flange 26 and the cover plate 28 are fixed to the wall 24 by suitable threaded bolts. The bushing 18 surrounds in spaced relationship such portions of the shaft 14, 16 as extend out of the inner race ring 20. A disc 30 is mounted on one of said portions in contact with an annular shoulder of the shaft 14 and with the inner race ring 20 of the ball-bearing. A free space surrounds the periphery of the disc 30 within the bushing 18 and communicates with a plurality of bores 32 extending through the bushing 18 in parallel relationship to the shaft 14, 18. These bores 32 form a circular set of passageways for the lubricant, as will be explained hereinafter. On either side of the outer race ring 22 the bushing 18 is so internally cut out as to be provided with cylindrical internal faces 41 which coincide with the axes of the bores 32.

The bores contain cylindrical storage elements which consist of an absorptive porous material and abut on the right hand side of bushing 18 the cover plate 28 and on the left hand side of the bushing an annular disc 40. These cylindrical storage bodies co-operate with one of the cylindrical faces 41 to externally confine the free space surrounding the centrifugal disc 30. Any lubricant seeping from the antifriction bearing onto the disc 30 is hurled from the periphery of the disc by centrifugal force outwardly and hits the storage bodies to be absorbed by the same.

Figure 3:
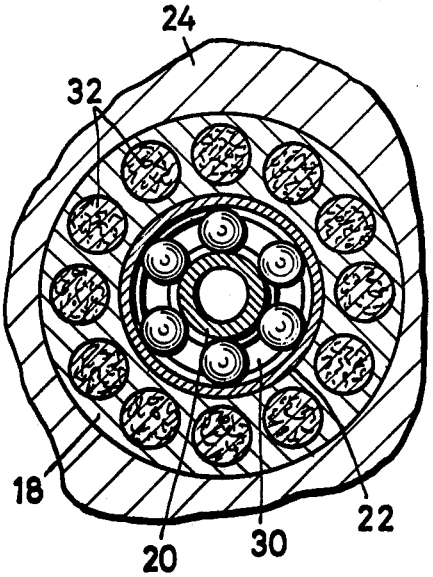
FIG. 3 is a section taken along the line 3—3 of FIG. 1.

Within the space surrounded by the internal cylindrical face 41 on the right hand side of the bushing 18 there is located a suitable means for mounting a wick on the bushing 18 in contact with the filling of porous material and in frictional contact with the peripheral surface of the extreme portion of shaft section 16 extending from the inner race ring 20. In the embodiment of our invention illustrated in FIGS. 1-3 this mounting means is formed by an annular member 34 provided with circumferential grooves on its outer peripheral surface and on its inner peripheral surface and with a radial passageway. The side face of the annular member 34 adjacent to the cover plate 28 is provided with a circular set of warts 43 which keep the annular member 34 spaced from the cover plate 28 and afford communication of the space between the member 34 and the cover plate 28 with the space surrounded by the cylindrical face 41.

Two plies of a wick 36 extend through the radial passageway of the annular member 34 and form an inner loop and an outer loop. The inner loop is located in the internal groove of the annular member 34 and is held by the same in intimate contact with the shaft section 16 whereas the outer loop of the wick is located in the outer peripheral groove of the annular member 34 and is held by the same in intimate contact with the cylindrical storage elements located in the bores 32 of bushing 18.

The portion of the shaft section 16 that is contacted by the wick 36 constitutes a surface of revolution on which a thin film of lubricant is deposited by the wick soaked with the liquid lubricant which in operation of the bearing is continually transferred by the parallel storage elements in bores 32 to the outer loop of the wick 36. This surface of revolution is preferably provided with one or more helical grooves 38 of such hand as to appear to move towards the left during rotation of the rotor 12 in the direction of the arrow as viewed in FIG. 1. These grooves promote the transfer of the film of lubricant deposited by the inner loop of the wick 36 on the surface of revolution towards the inner race ring 20.

The porous material of which the storage elements in bores 32 consist may be the same material as that of the wick 36 such as felt or an equivalent textile material. Alternatively, however, the storage elements in bores 32 may consist of a porous metal, such as copper. This metal is soaked with the liquid lubricant just as is the wick.

The operation of our novel lubricating system is as follows:

When the shaft 10 with the rotor 12 rotates in the direction of the arrow, the shaft section 16 will strip some lubricant from the surrounding wick 36 held in contact under pressure exerted by annular member 34. This lubricant is fed by the grooves 38 with reference to FIG. 1 towards the left. It will creep into contact with the endface of the inner race ring 20, will creep outwardly thereon under the influence of the centrifugal force and will be fed into the ball-bearing thus lubricating the same continuously. The lubricant will seep from the antifriction bearing towards the left into contact with the centrifugal disc 30 and will be hurled from the periphery thereon into contact with the cylindrical storage elements in bores 32.

In this manner the lubricant will be fed in a closed circuit through the porous material of the storage element and longitudinally through the latter in which the lubricant will be filtered and freed of any impurities.

The annular cover plate 40 may be held in position by the provision of a flange on the bushing 18 bent inwardly into contact with the cover plate 40. The inner surface of this cover plate 40 may be coated with a material repelling the lubricant and thus preventing the lubricant from creeping from the storage elements inwardly on the inner surface of cover plate 40 and out of the lubricating system into the interior of the housing formed by wall 24.

Figure 2:
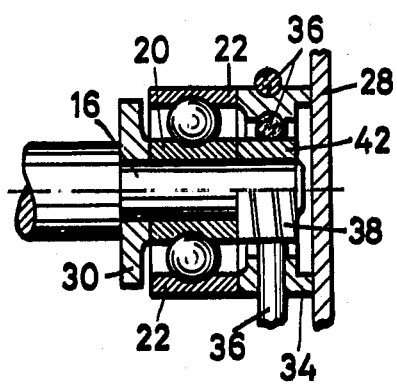
FIG. 2 is similar to the central portion of FIG. 1 and illustrates a modified embodiment of our invention.

The feed path of the lubricant extending from the wick 36 to the endface of the inner race ring 20 can be reduced by a modification of the embodiment shown in FIGS. 1-4. This modification is illustrated in FIG. 2 showing that the surface of revolution of the shaft which is in frictional contact with the wick 36 and is provided with the helical grooves 38 has the same diameter as the inner race ring 20 and lies flush therewith. For this purpose the portion of shaft section 16 extending out of the inner race ring 20 is given a larger diameter by the provision of a cylindrical ring 42 mounted on the extreme endportion of shaft section 16. In this embodiment the peripheral groove provided in the inner race ring 20 accommodating the spherical antifriction elements has a much shorter surface distance from the wick 36 than it has in the embodiment illustrated in FIG. 1.

The driving means for imparting rotation to the shaft 14 and the rotor 12 is not illustrated. It may be a three-phase alternating current motor.

The pressure exerted by the inner loop of the wick on the surface of revolution provided with the helical grooves 38 depends on the relative diameters of the wick and of the peripheral groove of member 34 accommodating the wick.

The quantity of the lubricant which is stripped by the shaft 16 during its rotation from the wick 36 and is fed by the helical grooves to the antifriction bearing depends on the capillary qualities of the wick, on the size of the contact surface and of the pressure of contact.

Figure 4:
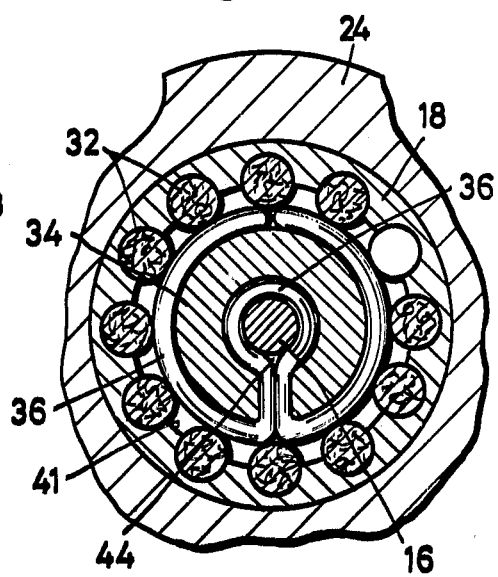
FIG. 4 is the section taken along the line 4—4 of FIG. 1.

As illustrated in FIG. 4 one or more of the bores 32 may be left empty and free from the filling material to conduct air impelled by the disc 30 from one of the spaces surrounded by the surfaces 41 to the other one of such spaces. Moreover, the annular member 34 may be provided with suitable apertures communicating with an interstice 44 between the adjacent plies of the wick. With this design the rotating centrifugal disc 30 will act as an impeller maintaining a circulation of air from the space surrounding the periphery of the centrifugal disc 30 through the empty bore or bores 32 into the space between the member 34 and the cover plate 28 and thence through the interstice 44 and through the space between the race rings of the antifriction bearing back to the space containing the disc 30. This circulation of air will promote the circulation of the lubricant.

Preferably the transverse central plane of bushing 18 coincides with the centers of the spherical antifriction elements. This will result in a symmetrical design of the lubricating system. Such symmetry is desirable in all elements of a gyroscope.

In the foregoing we have described in considerable detail the construction and operation of the illustrated exemplary embodiments of our invention in order to insure a complete understanding thereof. However, it is to be understood that the invention is not limited to the particular application or to the details of construction of the illustrated embodiments and we desire to cover by the appended claims such other applications and modifications as do not depart from the true spirit and scope of our invention.

What we claim is:

1. The combination comprising a rotary shaft, an inner race ring thereon, an outer race ring surrounding said inner race ring, a set of antifriction elements mounted between said race rings for rolling motion thereon, a supporting member fixed to said outer race ring and surrounding in spaced relationship such portions of said shaft as extend out of said inner race ring, a disc on one of said portions, a plurality of passageways extending through said supporting member in parallel relationship to said shaft and communicating with spaces located between said shaft and said supporting member laterally of said race rings, a filling of porous material soaked with a liquid lubricant mounted in said passageways and in said spaces and surrounding said disc for interception of lubricant globules hurled from the periphery of said disc through one of said spaces, a wick, and means for mounting said wick in the other one of said spaces in frictional contact with the other one of said portions of said shaft and in contact with said porous material located in the other one of said spaces.

2. The combination claimed in claim 1 in which said means for mounting said wick comprises an annular member mounted on said shaft within said other one of said spaces and provided with a radial passageway, said wick extending through said passageway and in contact with the inner peripheral surface and with the outer peripheral surface of said annular member.

3. The combination claimed in claim 1 in which one of said plurality of passageways is free from said filling to conduct air impelled by said disc during rotation of said shaft from said one of said spaces to said other one of said spaces.

4. The combination comprising a rotary shaft, an inner race ring thereon, an outer race ring surrounding said inner race ring, a set of antifriction elements mounted between said race rings for rolling motion thereon, a supporting member fixed to said outer race ring and provided with at least one cavity, a filling of porous material soaked with a liquid lubricant mounted in said cavity, a wick, means for mounting said wick on said supporting member in contact with said filling and in frictional contact with a cylindrical surface of said shaft located close to one end of said inner race ring, said surface being provided with helical grooves for feeding lubricant from said wick to said inner race ring during relative rotation of said shaft and said supporting member.

5. The combination comprising a rotary shaft, an inner race ring thereon, an outer race ring surrounding said inner race ring, a set of antifriction elements mounted between said race rings for rolling motion thereon, a supporting member fixed to said outer race ring and surrounding in spaced relationship such portions of said shaft as extend out of said inner race ring, a disc on one of said portions, a plurality of passageways extending through said supporting member in parallel relationship to said shaft and communicating with spaces located between said shaft and said supporting member laterally of said race rings, a filling of porous material soaked with a liquid lubricant mounted in said passageways and in said spaces and surrounding said disc for interception of lubricant globules hurled from the periphery of said disc through one of said spaces, a wick, and means for mounting said wick in the other one of said spaces in frictional contact with the other one of said portions of said shaft and in contact with said porous material located in the other one of said spaces, the other one of said portions of said shaft being provided with a helical groove for feeding liquid lubricant from said wick to said inner race ring during rotation of said shaft.

6. The combination claimed in claim 5 in which said other one of said portions of said shaft has substantially the same external diameter as said inner race ring.

7. The combination comprising a rotary shaft, an inner race ring thereon, an outer race ring surrounding said inner race ring, a set of antifriction elements mounted between said race rings for rolling motion thereon, a supporting member fixed to said outer race ring and surrounding in spaced relationship such portions of said shaft as extend out of said inner race ring, a disc on one of said portions, a plurality of passageways extending through said supporting member in parallel relationship to said shaft and communicating with spaces located between said shaft and said supporting member laterally of said race rings, a filling of porous material soaked with a liquid lubricant mounted in said passageways and in said spaces and surrounding said disc for interception of lubricant globules hurled from the periphery of said disc through one of said spaces, a wick, an annular member mounted on said shaft within said other one of said spaces and provided with a radial passageway, said wick extending through said radial passageway and in contact with the other peripheral surface of said annular member and with the inner peripheral surface of said annular member, said other one of said portions of said shaft having frictional contact with said wick being provided with a helical groove for feeding said lubricant from said wick to said inner race ring during rotation of said shaft, said filling extending through said plurality of passageways and through said spaces, and a pair of cover plates mounted on said supporting member and extending at right angles to the axis of said shaft in spaced relationship to said race rings and confining said spaces, at least one of said plurality of passageways being free from said filling to conduct air impelled by said disc from said one of said spaces to said other one of said spaces, said annular member being so shaped as to afford such air free passage from said other one of said spaces through between said race rings.

* * * * *